No. 834,879. PATENTED NOV. 6, 1906.
W. W. ANNABLE.
MOTOR WHEEL FOR VEHICLES.
APPLICATION FILED JULY 26, 1905.
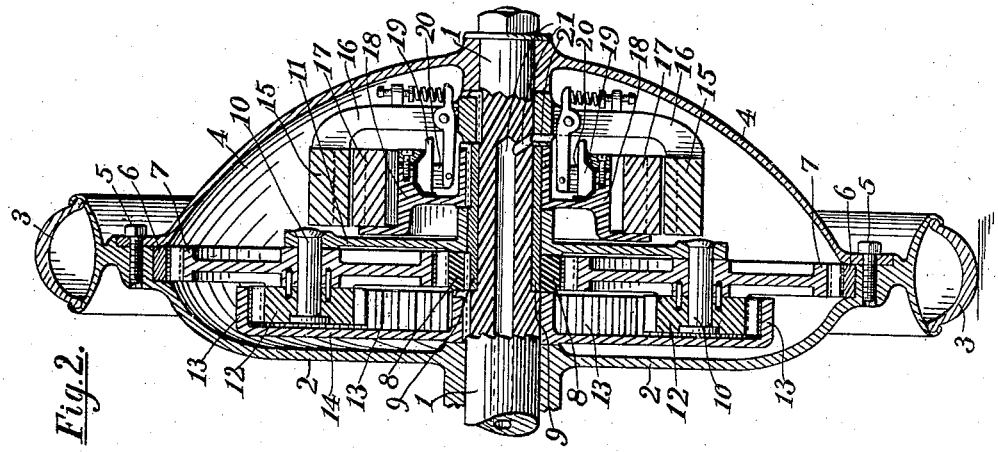
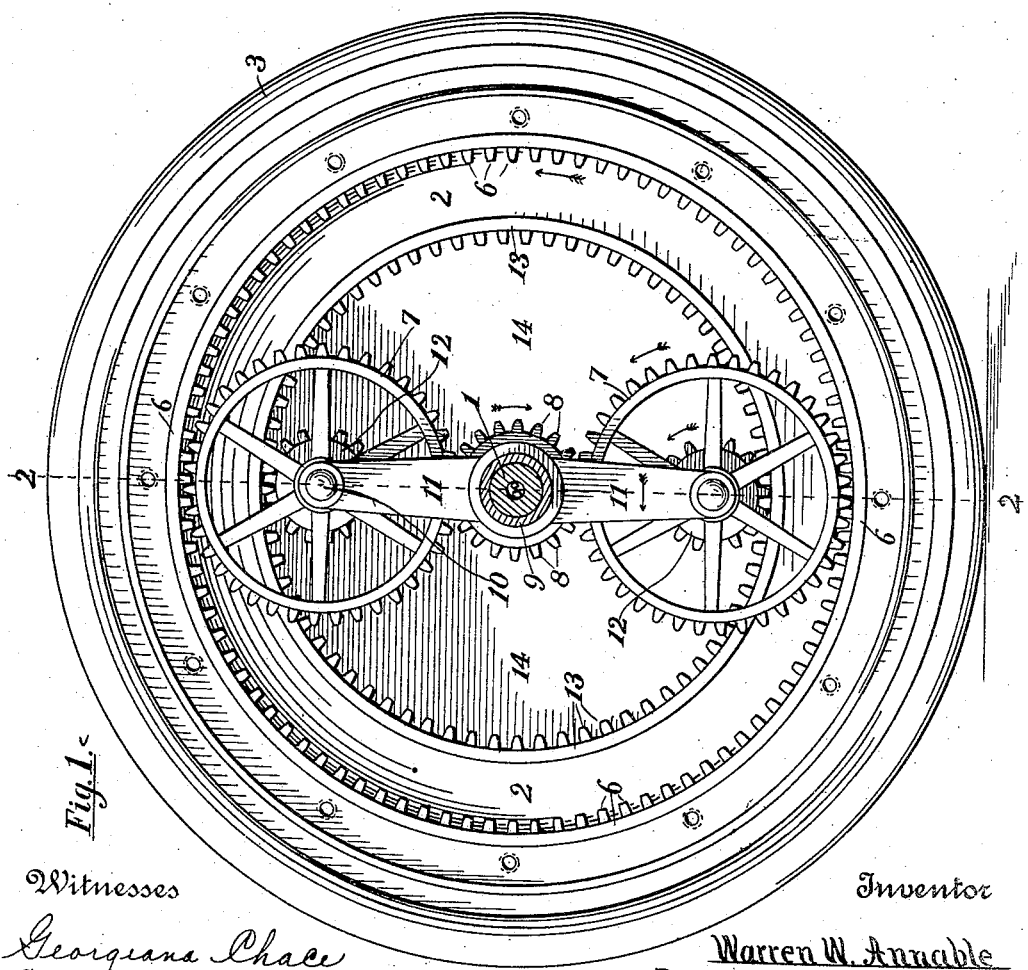
Witnesses
Georgiana Chace
Edward R. Monroe
Inventor
Warren W. Annable
By Luther V. Moulton
Attorney

UNITED STATES PATENT OFFICE.

WARREN W. ANNABLE, OF GRAND RAPIDS, MICHIGAN, ASSIGNOR OF ONE-HALF TO BENJAMIN S. HANCHETT, OF GRAND RAPIDS, MICHIGAN.

MOTOR-WHEEL FOR VEHICLES.

No. 834,879.   Specification of Letters Patent.   Patented Nov. 6, 1906.

Application filed July 26, 1905. Serial No. 271,303.

*To all whom it may concern:*

Be it known that I, WARREN W. ANNABLE, a citizen of the United States, residing at Grand Rapids, in the county of Kent and State of Michigan, have invented certain new and useful Improvements in Motor-Wheels for Vehicles; and I do hereby declare the following to be a full, clear, and exact description of the invention, such as will enable others skilled in the art to which it appertains to make and use the same.

My invention relates to improvements in motor-wheels for vehicles, and more particularly to electrically-propelled wheels having the motor within the wheel; and its object is to provide the same with various new and useful features hereinafter more fully described, and particularly pointed out in the claims, reference being had to the accompanying drawings, in which—

Figure 1 is an elevation of a wheel with the outer web and the motor removed to show the gearing; Fig. 2, a vertical section of the device entire, taken on the line 2 2 of Fig. 1.

Like numbers refer to like parts in both of the figures.

1 represents the axle, on which the wheel is rotative. The wheel is provided with a concave or recessed inner web, 2 journaled on the axle and having a rim provided with a tire 3, preferably pneumatic.

4 is a concave outer web to the wheel, detachably secured to the rim by bolts or screws 5 and journaled on the outer end of the axle. These webs 2 and 4 form a closed chamber within which the gearing and motor are arranged, the wheel-bearings being spaced apart and rotative on the axle 1. Secured between the peripheries of these webs and clamped by the bolts 5 is an internal gear 6, which is the driven gear of the series and operates the wheel. Connecting this gear with a driving-pinion 8 are two opposing planet-gears 7. Attached to the gears 7 and rotative therewith are pinions 12, which pinions engage a stationary internal gear 13, the web 14 of which gear is fixed upon the axle 1 adjacent to the inner bearing of the wheel. The gears 7 and 12 are journaled on studs 10, supported in the opposite ends of a yoke 11, rotative on the outside of a sleeve 9, which sleeve is also rotative on the axle 1. The driving-gear 8 and the rotative member of the motor are rigidly attached to the respective ends of this sleeve.

The motor as shown in this device consists of a Gramme-ring armature 17, mounted on a spider 18, keyed to the sleeve 9 to rotate the same, and field-magnets 15 to rotate the armature, which magnets are supported by arms 16, fixed to the axle adjacent to the outer bearing of the wheel.

Within the spider 18 is a commutator 19, and on the arms 16 are mounted brushes 20. The electrical conductors and coils are not shown. Said conductors are extended through openings 21 in the axle and arms and connect with the brushes. In operation the attraction of the field-magnets rotates the armature, which in turn rotates the sleeve and drives the pinion 8. This pinion rotates the planet-gears 7, which in turn drive the internal gear 6, which operates the wheel.

To provide sufficient speed of the motor I provide the pinions 12, which traverse the fixed internal gear 13 in a direction opposite to the direction of rotation of the gear 6, and thus subtract a portion of the forward movement of the gear 6, depending upon the proportions of the pinions 12 and gear 13. I can thus also vary the ratio of speed between the motor and wheel by changing these pinions 12 and gear 13. The larger they are the greater the difference in speed, and the smaller they are the less said difference will be. By this construction I can also gain access to all the mechanism within the wheel or remove the same as occasion requires without taking the wheel proper off the vehicle, the rim and inner web serving to support the vehicle when all else has been detached from the axle and removed. The sleeve and yoke both rotate in the same direction, thus reducing the friction, and the gear 13 serves as a fixed fulcrum near the rim of the wheel, to which rim the power is applied by a large internal gear close to same. I thus reduce the strains, friction, and risk of breakage of the parts.

Having thus fully described my invention, what I claim, and desire to secure by Letters Patent, is—

1. The combination of an inner concave web having an axial bearing, a wheel-rim integral therewith, an outer concave web having an axial bearing, bolts to connect the peripheries of the webs, an internal gear clamped between the peripheries of the webs and held thereby, a driving-pinion, gears connecting the driving-pinion and the internal gear, and a rotative motor member connected to the pinion.

2. The combination of a non-rotative axle, an inner web journaled on the axle, a wheel-rim on the web, an outer web detachably secured to the inner web near the periphery and journaled on the axle, an internal gear between the outer portions of the webs and held thereby, a sleeve rotative on the axle, a rotative motor member and driving-pinion attached to the sleeve, and gears connecting the driving-pinion and the internal gear.

3. The combination of a non-rotative axle, a wheel journaled on the axle, an internal gear attached to the wheel, a gear fixed on the axle, a driving-pinion rotative on the axle, a rotative motor member connected to the pinion, a planet-gear connecting the pinion and the internal gear on the wheel, a pinion attached to the planet-gear and engaging the fixed gear and means for movably supporting the axis of the planet-gear and of the pinion.

4. The combination of an axle, a wheel journaled on the axle, an internal gear attached to the wheel, an internal gear fixed on the axle, a sleeve rotative on the axle, a yoke rotative on the sleeve, a driving-pinion and a rotative motor member attached to the sleeve, planet-gears mounted on the yoke, and pinions attached to the planet-gears and engaging the fixed internal gear.

5. The combination of an axle, a wheel journaled on the axle and having webs detachably secured to each other and spaced apart to inclose the gearing and motor, a gear fixed on the axle, a sleeve rotative on the axle, a rotative motor member and driving-pinion attached to the sleeve, a yoke rotative on the sleeve, studs in the yoke, planet-gears journaled on the studs, pinions attached to the planet-gears and engaging the fixed gear, and an internal gear attached to the wheel and engaged by the planet-gears.

6. The combination of an axle, a wheel having an inner web journaled on the axle, a gear attached to the wheel, a driving-pinion journaled on the axle, an armature connected to the driving-pinion, field-magnets opposite the armature, arms supporting the field-magnets and fixed on the axle, gears connecting the driving-pinion and the gear on the wheel, and an outer web detachably connected to the inner web near its rim and inclosing the gearing and motor.

7. The combination of an axle, a wheel and a sleeve separately journaled on the axle, a driving-pinion and a spider attached to the sleeve, an armature mounted on the spider, an internal commutator within the spider, field-magnets outside the armature, arms supporting the field-magnets and fixed on the axle, brushes mounted on the arms and engaging the commutator, and gearing connecting the driving-pinion and the wheel.

8. The combination of an axle, an inner web journaled on the axle, a wheel-rim attached to said web, an outer web journaled on the axle and detachably secured to the inner web at its periphery, and spaced apart from the inner web to form a chamber, an internal gear clamped between the webs near the rim, an internal gear fixed on the axle near the inner web, a sleeve rotative on the axle, a driving-pinion and a spider attached to the sleeve, a yoke rotative on the sleeve, planet-gears mounted on the yoke and connecting the driving-pinion and the gear between the webs, pinions attached to the planet-gears and engaging the fixed gear, an armature mounted on the spider, field-magnets near the armature, and arms fixed on the axle and supporting the field-magnets.

In testimony whereof I affix my signature in presence of two witnesses.

WARREN W. ANNABLE.

Witnesses:
GEORGIANA CHACE,
LUTHER V. MOULTON.